United States Patent
Al-Haj Ali et al.

(10) Patent No.: US 10,358,507 B2
(45) Date of Patent: Jul. 23, 2019

(54) PROCESS FOR SEPARATING HYDROCARBONS FROM POLYMER

(71) Applicant: BOREALIS AG, Vienna (AT)

(72) Inventors: Mohammad Al-Haj Ali, Helsinki (FI); Vasileios Kanellopoulos, Espoo (FI); Apostolos Krallis, Espoo (FI); Henry Sleijster, Echt (NL); Samuli Zitting, Tuusula (FI)

(73) Assignee: BOREALIS AG, Vienna (AT)

( * ) Notice: Subject to any disclaimer, the term of this patent is extended or adjusted under 35 U.S.C. 154(b) by 88 days.

(21) Appl. No.: 15/562,323

(22) PCT Filed: Mar. 24, 2016

(86) PCT No.: PCT/EP2016/056507
§ 371 (c)(1),
(2) Date: Sep. 27, 2017

(87) PCT Pub. No.: WO2016/156185
PCT Pub. Date: Oct. 6, 2016

(65) Prior Publication Data
US 2018/0346612 A1 Dec. 6, 2018

(30) Foreign Application Priority Data
Mar. 27, 2015 (EP) .................................... 15161260

(51) Int. Cl.
C08F 6/00 (2006.01)
B01D 1/00 (2006.01)
B01D 3/06 (2006.01)
B01D 1/16 (2006.01)
C08F 6/12 (2006.01)
C08F 6/10 (2006.01)

(52) U.S. Cl.
CPC .............. *C08F 6/003* (2013.01); *B01D 1/16* (2013.01); *B01D 3/06* (2013.01); *C08F 6/10* (2013.01); *C08F 6/12* (2013.01)

(58) Field of Classification Search
CPC ... B01D 1/00; B01D 1/06; B01D 1/16; B01D 1/18; B01D 3/06; C08F 6/003; C08F 6/10; C08F 6/12
USPC .......................................................... 526/71
See application file for complete search history.

(56) References Cited

U.S. PATENT DOCUMENTS

| | | | | | |
|---|---|---|---|---|---|
| 2,868,714 A * | 1/1959 | Gilmore | ................... | B01D 3/06 196/114 |
| 3,036,057 A * | 5/1962 | Wallace | ................... | B01D 3/06 528/484 |
| 3,072,626 A * | 1/1963 | Cines | ........................ | C08C 2/06 159/17.3 |
| 3,402,023 A * | 9/1968 | Dobo | ....................... | B01D 3/14 137/199 |
| 3,457,248 A * | 7/1969 | Cunningham | ........... | B01D 3/06 159/2.2 |
| 3,470,070 A * | 9/1969 | Heckart | ................... | B01D 3/06 203/88 |
| 3,476,736 A * | 11/1969 | Kahre | ..................... | C08F 10/00 528/499 |
| 3,586,089 A * | 6/1971 | Mato | ....................... | B01D 1/18 159/2.2 |
| 3,834,441 A * | 9/1974 | Vernaleken | .............. | B01D 3/06 159/13.1 |
| 3,841,381 A * | 10/1974 | Dassesse | .................. | B01D 3/06 159/15 |
| 3,887,425 A * | 6/1975 | Munch | ..................... | B01D 3/06 159/2.1 |
| 4,158,092 A * | 6/1979 | Botsch | ..................... | B01D 1/16 159/48.2 |
| 4,310,973 A * | 1/1982 | King | ....................... | B01D 1/18 34/368 |
| 4,933,400 A * | 6/1990 | Jarvis | ...................... | C08F 6/003 526/65 |
| 5,597,892 A * | 1/1997 | Hanson | .................. | B01J 8/0055 528/501 |
| 6,034,209 A * | 3/2000 | Takeyama | ................ | B01D 1/16 523/328 |
| 6,420,516 B1 * | 7/2002 | Tau | ......................... | C08F 6/003 528/501 |
| 6,566,460 B1 * | 5/2003 | Salmon | .................... | B01J 8/004 422/132 |
| 6,685,802 B1 * | 2/2004 | Nazzer | .................. | B01D 1/0094 159/2.1 |
| 7,745,568 B2 * | 6/2010 | Vandaele | .................. | B01J 8/003 34/259 |
| 9,815,915 B2 * | 11/2017 | Stavens | ................... | C08F 10/00 |
| 2016/0096924 A1 * | 4/2016 | Kim | ........................ | C08G 69/26 528/336 |
| 2017/0014346 A1 * | 1/2017 | Santos | ................. | A61K 9/1635 |

FOREIGN PATENT DOCUMENTS

| | | |
|---|---|---|
| CN | 103263986 | 8/2013 |
| CN | 103263986 A | 8/2013 |
| KR | 20140023143 A | 2/2014 |
| KR | 201400231343 | 2/2014 |
| WO | 2013048785 | 4/2013 |
| WO | 2013048785 A1 | 4/2013 |

OTHER PUBLICATIONS

International Preliminary Report on Patentability for International Application No. PCT/EP2016/056507 dated Oct. 3, 2017; 7 pages.

(Continued)

*Primary Examiner* — Rip A Lee
(74) *Attorney, Agent, or Firm* — Roberts Mlotkowski Safran Cole & Calderon, P.C.

(57) ABSTRACT

The present invention is directed to a process for separating hydrocarbons from a solution comprising a polymer. The process comprises the steps of: (A) withdrawing a solution stream comprising the polymer from a first vessel; (B) passing the solution stream into a flash vessel; (C) spraying the solution stream into droplets in the first flash vessel thereby establishing a stream of droplets within the flash vessel. The solution forms a downwards falling film within the flash vessel.

9 Claims, No Drawings

(56) References Cited

OTHER PUBLICATIONS

Written Opinion of International Application No. PCT/EP2016/056507 dated Jun. 16, 2016.
International Search Report of International Application No. PCT/EP2016/056507 dated Jun. 16, 2016.

* cited by examiner

PROCESS FOR SEPARATING HYDROCARBONS FROM POLYMER

CROSS REFERENCE TO RELATED APPLICATIONS

This present application is a 371 National Stage of PCT/EP2016/056507 filed Mar. 24, 2016, which claims priority to European Application No. 15161260.3 filed Mar. 27, 2015, the contents of which are hereby incorporated by reference in their entirety.

FIELD OF THE INVENTION

The present invention is directed to a method for separating hydrocarbons from polymer solution. More specifically, the present invention is directed to a method of removing volatile hydrocarbons from a solution comprising an olefin polymer. Especially, the present invention is directed to a process for removing hydrocarbons from a solution comprising an olefin copolymer which process is more effective than the prior art processes.

PROBLEM TO BE SOLVED

WO-A-99/32525 discloses a process wherein a polyolefin solution introduced to a flash vessel without preheating. The solution may be introduced into the flash vessel by using spraying nozzles.

WO-A-2008082511 discloses an in-line blending process. The process comprises a reactor train comprising a separator unit where the hydrocarbons are separated from the polymer. The document did not disclose how the separator unit operates.

WO-A-2009126277 discloses a process where the polymer and solvent are separated in a lower critical solution temperature separator. The document did not disclose separation of polymer from the solvent by establishing a downwards falling film.

In view of the prior art there still remains a problem for more efficient process for removing hydrocarbons from polymer solutions.

SUMMARY OF THE INVENTION

The present invention provides a process for separating hydrocarbons from a solution comprising a polymer, the process comprising the steps of: (A) withdrawing a solution stream comprising the polymer from a first vessel; (B) passing the solution stream into a vertical flash vessel; (C) spraying the solution stream into droplets in the flash vessel thereby establishing a stream of droplets within the flash vessel; characterised in that either (1) the flash vessel has a generally cylindrical shape and the solution forms a downwards falling film within the flash vessel and wherein the process comprises the step of (D) spraying the solution stream into droplets in the flash vessel thereby establishing a stream of droplets within the flash vessel and directing the stream of droplets to follow a trajectory which is tangential to the wall of the flash vessel; or (2) the flash vessel has a generally conical shape and wherein the process comprises either the step of (D) spraying the solution stream into droplets in the flash vessel thereby establishing a stream of droplets within the flash vessel and directing the stream of droplets to follow a trajectory which is tangential to the wall of the flash vessel; or the step of (E) spraying the solution stream into droplets in the flash vessel thereby establishing a stream of droplets within the flash vessel and directing the stream of droplets to follow a trajectory which is axial to the wall of the flash vessel and wherein the droplets are formed in at least one spraying nozzle located eccentrically within the flash vessel.

DETAILED DESCRIPTION

In the text within this application the percentage numbers mean % by weight unless anything else has been specified.
Polymerisation The polymer is typically produced in solution polymerisation process. In solution polymerisation process the monomer is polymerised at a temperature in which the polymer is dissolved in the solvent mixture which is present in the process.

The process includes one or more polymerisation reactors. Suitable reactors include unstirred or stirred, spherical, cylindrical and tank-like vessels and recirculating loop reactors and tubular reactors. Such reactors typically include injection points for monomer, comonomer, solvent, catalyst and optional other reactants and additives and withdrawal point for polymer solution. In addition the reactors may include heating or cooling means.

Typically the solution polymerisation process is a high temperature solution polymerisation process, using a polymerisation temperature of greater than 100° C. Preferably the polymerisation temperature is at least 110° C., more preferably at least 150° C. The polymerisation temperature can be up to 250° C. The pressure in the solution polymerisation process is preferably in a range of from 30 to 200 bar, preferably from 50 to 150 bar and more preferably from 60 to 150 bar.

The monomer can be any polymerisable monomer and preferably it is an olefin monomer. More preferably the olefin monomer is selected from the group consisting of ethylene, propylene and 1-butene.

Typically also a comonomer is used in the polymerisation. When the monomer is an olefin monomer as disclosed above, then the comonomer is different from the olefin monomer and is selected from the group consisting of linear and cyclic olefins and diolefins having from 2 to 12 carbon atoms and the mixtures thereof.

When the monomer is an olefin monomer the polymerisation is typically conducted in the presence of an olefin polymerisation catalyst. Such olefin polymerisation catalysts comprise a transition metal compound, preferably a metal compound of group 4, such as a compound of titanium, zirconium or hafnium.

The transition metal compound may be a halide of the transition metal, such as a trihalide or a tetrahalide. Typically the transition metal halide is a titanium halide, such as titanium trichloride or titanium tetrachloride.

The transition metal compound may also be a transition metal alkyl or transition metal alkoxide compound. Such compounds are often contacted with a chlorinating compound, such as an alkyl chloride.

The transition metal compound may be combined with a group 2 metal halide, such as magnesium halide, like magnesium dichloride, and/or with a group 13 metal halide, such as aluminium or boron halide, like aluminium trichloride. Such catalysts are well known in the art and are referred to as Ziegler-Natta catalysts. A Ziegler-Natta catalyst is typically used in combination with a cocatalyst, such as an aluminium alkyl.

The transition metal compound may also be a compound comprising an organic ligand having a cyclopentadienyl structure, such as cyclopentadienyl, fluorenyl or indenyl. Such organic ligands may also bear substituents. The transition metal may have one or two such organic ligands, which optionally are bridged, and two or three other ligands, such as alkyl, aryl or halide. Such catalysts are also well known in the art and are referred to as metallocene catalysts.

In solution polymerisation process a solvent is also present. The solvent is in liquid or supercritical state in the polymerisation conditions. The solvent is typically and preferably a hydrocarbon solvent, such as a liquid hydrocarbon solvent. The liquid hydrocarbon solvent used is preferably a $C_{5-12}$-hydrocarbon which may be unsubstituted or substituted by $C_{1-4}$ alkyl group such as pentane, methyl pentane, hexane, heptane, octane, cyclohexane, methylcyclohexane and hydrogenated naphtha. More preferably unsubstituted $C_{6-10}$-hydrocarbon solvents are used.

Also other components may be added into the reactor. It is known to feed hydrogen into the reactor for controlling the molecular weight of the polymer formed during the polymerisation. Also the use of different antifouling compounds is known in the art. In addition different kinds of activity boosters or activity retarders may be used for controlling the activity of the catalyst.

The polymer is formed in the solution polymerisation process, for instance, due to the contacting of the monomer and the comonomer with the polymerisation catalyst. The conditions in the reactor are such that the polymer is dissolved in the solvent. Typically the content of the polymer in the solution comprising the solvent, the polymer and the unreacted monomer and comonomer is from 10 to 50% by weight, preferably from 10 to 40% by weight, more preferably from 10 to 35% by weight, such as from 10 to 30% by weight.

Solution Stream

The solution stream is the feed stream to the flash vessel. The solution stream may be the product stream from the polymerisation reactor, as discussed above. The solution stream then typically has the polymer content, composition temperature and pressure as disclosed in the section above.

The solution stream may also be a product stream from an upstream flash vessel. In such a case the polymer content in solution stream withdrawn from the upstream flash vessel is typically from 35 to 99% by weight.

The solution stream is preferably heated prior to its entry to the flash vessel. The heating may be achieved by passing the solution through one or more flash heaters, or through one or more jacketed pipes, or through a heat exchanger located upstream of the flash vessel.

Flash Vessel

The volatile hydrocarbons are removed from the polymer solution in one or more flash stages which are conducted in one or more flash vessels. In the flash stage the pressure is reduced and thereby the volatile hydrocarbons evaporate from the solution. It is also possible to increase the temperature of the solution stream upstream of the flash vessel for further enhancing the evaporation of hydrocarbons.

The flash vessel is a vertical vessel. It preferably has a generally cylindrical shape. Thereby the flash vessel has a section which has approximately a circular cross-section. Preferably the flash vessel has a cylindrical section which has a shape of a circular cylinder. In addition to the cylindrical section the flash vessel may have additional sections, such as a bottom section, which may be conical, and a top section which may be hemispherical. Alternatively, the flash vessel may also have a generally conical shape.

The temperature in the flash vessel is typically from 130 to 250° C. The temperature should be sufficiently high to keep the viscosity of the solution at a suitable level but less than the temperature where the polymer is degraded. The pressure in the flash vessel is typically from 20 bar to atmospheric, or even less than atmospheric.

The solution stream enters the flash vessel at the top. The solution travels downwards in the flash vessel while the gases which evaporate from the solution travel upwards. According to the present invention the polymer solution forms a thin film which falls downwards in the flash vessel. This facilitates the removal of hydrocarbons from the polymer solution. The gases are typically withdrawn from the top of the flash vessel while the solution is withdrawn from the bottom.

According to the present invention the solution stream is sprayed in the flash vessel. The spraying can be done by using one or more suitable nozzles which disperse the solution stream into droplets. Such nozzles are well known in the industry and include air atomising nozzles, flat fan nozzles, hollow cone nozzles and full cone nozzles. Preferably the nozzles break the stream into droplets having the size of not more than about 1 mm.

The nozzle forms a stream of droplets in the flash vessel. According to the process of the present invention the stream of droplets coagulates within the flash vessel and forms a falling film having a relatively high surface area. This enhances the mass transfer of the volatile components from the solution.

According to one embodiment the flash vessel has a vertical generally cylindrical shape. Then the stream of droplets is directed tangentially with the wall of the flash vessel by a suitable position of the nozzle. Thus, the nozzle is suitably located relatively near to the wall so that its outlet is directed tangentially with the wall. When the stream of the droplets exits the nozzle it moves in the direction of the wall forming a downwards falling film. According to another embodiment the flash vessel has a vertical generally conical shape. In such embodiment it is possible to direct the stream of the droplets tangentially with the wall of the flash vessel, as described above. However, it is also possible direct the droplets axially towards the wall of the flash vessel. The nozzle or the nozzles are then arranged eccentrically within the flash vessel. In both arrangements the polymer solution forms a falling film within the flash vessel.

According to the present invention the hydrocarbons are removed from the polymer solution in at least one flashing step. It is thus possible to remove the hydrocarbons in two or more flashing steps where each flashing step is conducted in a dedicated flash vessel. Thereby the primary flash vessel receives the solution stream and removes the bulk of volatile hydrocarbons. The solution is withdrawn from the primary flash vessel and passed to a secondary flash vessel where a further quantity of the hydrocarbons is removed. As it is well understood by the person skilled in the art, the pressure in each downstream flash vessel is less than in the upstream flash vessel.

When there are multiple flash vessels any one or all of the flash vessels may be arranged to operate according to the present invention. A downwards falling film is however most advantageously formed when the viscosity of the solution is relatively small. It is therefore preferred that the upstream flash vessel operates according to the present invention.

When multiple flash vessels are used for removing the hydrocarbons from the solution the polymer content in solution stream withdrawn from the upstream flash vessel is typically from 35 to 99% by weight. The hydrocarbons are further removed in one or more downstream flash vessels. In other words, the product stream withdrawn from the upstream flash vessel contains from 1 to 65% by weight of residual hydrocarbons.

When viewed from a different angle, the hydrocarbon stream withdrawn from the flash vessel is from 35 to 80% by weight from the total material streams withdrawn from the flash vessel. The hydrocarbon stream typically comprises unreacted monomer and also solvent and unreacted comonomer.

By using the flash according to the present invention it is possible to achieve high separation efficiency. For instance, separation efficiency for hydrocarbons containing 6 carbon atoms is at least 75% and preferably at least 80%. Additionally still, separation efficiency for hydrocarbons containing 8 carbon atoms is at least 60% and preferably at least 65%. The separation efficiency is defined as the mass flow of the component withdrawn in the vapour stream divided by the (theoretical) mass flow rate of the component in the vapour stream in equilibrium conditions.

It is possible to have more than two flashing steps and thus more than two flash vessels downstream of the reactor for removing the hydrocarbons. However, this increases the investment and operating costs. Therefore it is preferred to conduct the flashing in one or two steps in one or two flash vessels and especially it is preferred to conduct the flashing in two steps in two flash vessels.

The residual hydrocarbons eventually remaining in the polymer after the downstream flash vessel may be removed, as it is known in the art, by suitable venting arrangements in the extruder. In such methods gaseous material is removed from the extruder via one or more vent ports. Venting is suitably combined with stripping by using, for instance, water, nitrogen or carbon dioxide as stripping gas. Venting of gaseous material from the extruder is well known in the industry and is discussed, for instance, in the book of Chris Rauwendaal: "Polymer Extrusion", Carl Hanser Verlag, Munich 1986, in paragraphs 8.5.2 and 8.5.3.

Also other methods known in the art for removing the residual hydrocarbons from the polymer may be used. Such methods may be used instead of the above-mentioned methods of secondary flash and venting in an extruder, or alternatively they can be used in combination with either one or both of them.

EXAMPLES

Example 1

In a solution polymerisation reactor ethylene and a comonomer are polymerised in C6-hydrocarbon solvent. From the reactor a solution stream is withdrawn at a rate of 17000 kg/h, containing 20% by weight of the ethylene copolymer dissolved therein. The solution stream is passed into a flash vessel having a cylindrical body and a conical bottom section by spraying the stream into droplets and directing the droplet stream to a directory which is tangential to the wall of the flash vessel. Thereby a downwards falling film of polymer solution is formed within the flash vessel. A gas stream of 12000 kg/h is recovered from the flash vessel, containing 10% of C8-hydrocarbons and 86% of C6-hydrocarbons. From the bottom a solution stream is withdrawn at a rate of 5000 kg/h, containing 63% by weight of polymer.

Table 1 shows the process data and the separation efficiency of the hydrocarbon removal.

Comparative Example 1

The procedure of Example 1 is repeated except that the solution is not sprayed into the flash vessel but is introduced as a non-dispersed stream.

Comparative Example 2

The procedure of Example 1 is repeated except that the solution is sprayed downwards and thus not in a tangential direction. Thereby no downwards falling film is formed.

Example 2

The procedure of Example 1 is repeated with conditions as shown in Table 1.

Comparative Example 3

The procedure of Comparative Example 1 is repeated with conditions as shown in Table 1.

Comparative Example 4

The procedure of Comparative Example 2 is repeated with conditions as shown in Table 1.

TABLE 1

| Operating data of the examples | | | | | | |
|---|---|---|---|---|---|---|
| Example | E1 | CE1 | CE2 | E2 | CE3 | CE4 |
| Solution stream to a flash, kg/h | 17000 | 17000 | 17000 | 18000 | 18000 | 18000 |
| Polymer content at the inlet of a flash, % by weight | 20 | 20 | 20 | 23 | 23 | 23 |
| Polymer content at the outlet of the flash, % by weight | 63 | 50 | 55 | 59 | 48 | 52 |
| Ethylene gas from the flash, kg/h at the bottom | 0.9 | 1.8 | 1.2 | 2.7 | 4.4 | 3.7 |
| C6-hydrocarbon gas from the bottom of the flash, kg/h | 1500 | 2500 | 2100 | 1900 | 3000 | 2500 |
| C8-hydrocarbon gas from the bottom of the flash, kg/h | 400 | 600 | 500 | 1000 | 1400 | 1300 |
| Separation efficiency | 88 | 78 | 82 | 82 | 70 | 74 |
| Separation efficiency, C6-hydrocarbons | 86 | 77 | 81 | 81 | 70 | 75 |
| Separation efficiency, C8-hydrocarbons | 75 | 61 | 66 | 67 | 53 | 58 |
| T, °C. | 170 | 170 | 170 | 170 | 170 | 170 |
| P, bar | 7 | 7 | 7 | 7 | 7 | 7 |

The invention claimed is:

1. A process for separating hydrocarbons from a solution comprising a polymer, the process comprising the steps of: (A) withdrawing a solution stream comprising the polymer from a first vessel; (B) passing the solution stream into a vertical flash vessel; (C) spraying the solution stream into doplets in the vertical flash vessel thereby establishing a stream of droplets within the vertical flash vessel; wherein either (1) the vertical flash vessel has a generally cylindrical shape and the solution stream forms a downward falling film within the vertical flash vessel and wherein the process comprises the step of (D) spraying the solution stream into droplets in the vertical flash vessel thereby establishing a stream of droplets within the vertical flash vessel and directing the stream of droplets to follow a trajectory which is tangential to a wall of the vertical flash vessel; or (2) the vertical flash vessel has a generally conical shape and wherein the process comprises either the step of (D) spraying the solution stream into droplets in the vertical flash vessel thereby establishing a stream of droplets within the vertical flash vessel and directing the stream of droplets to follow a trajectory which is tangential to a wall of the flash vessel; or the step of (E) spraying the solution stream into droplets in the vertical flash vessel thereby establishing a stream of droplets within the vertical flash vessel and directing the stream of droplets to follow a trajectory which is axial to a wall of the vertical flash vessel and wherein the droplets are formed in at least one spraying nozzle located eccentrically within the vertical flash vessel.

2. The process according to claim 1, wherein the first vessel is a reactor vessel, and the process further comprises a step of polymerising a monomer in the reactor vessel to produce the solution comprising the polymer and withdrawing the solution stream from the reactor vessel.

3. The process according to claim 1 wherein the solution comprising the polymer contains from 10 to 35% by weight of the polymer.

4. The process according to claim 1 wherein the polymer is an olefin polymer comprising units derived from an olefin monomer and optionally units derived from a comonomer.

5. The process according to claim 4 wherein the olefin monomer is selected from the group consisting of ethylene, propylene and 1-butene.

6. The process according to claim 4 wherein the olefin polymer comprises units derived from a comonomer which is different from the olefin monomer and which is selected from the group consisting of linear and cyclic olefins and diolefins having from 2 to 12 carbon atoms and mixtures thereof.

7. The process according to claim 1 comprising a step of heating the solution stream upstream of the flash vessel.

8. The process according to claim 1 comprising the steps of (F) withdrawing a first product stream from the vertical flash vessel; and (G) passing the first product stream to a second flash vessel.

9. The process according to claim 1 wherein a product stream recovered from a bottom of the vertical flash vessel contains from 35 to 99% by weight of the polymer.

* * * * *